United States Patent
Lindström et al.

(10) Patent No.: US 7,785,380 B2
(45) Date of Patent: Aug. 31, 2010

(54) METHOD FOR REMOVING SULFUR FROM A HYDROCARBON FUEL

(75) Inventors: Bård Lindström, Stockholm (SE); Per Ekdunge, Västra Frölunda (SE)

(73) Assignee: Powercell Sweden AB (SE)

( * ) Notice: Subject to any disclaimer, the term of this patent is extended or adjusted under 35 U.S.C. 154(b) by 446 days.

(21) Appl. No.: 12/024,653

(22) Filed: Feb. 1, 2008

(65) Prior Publication Data
US 2009/0101544 A1    Apr. 23, 2009

Related U.S. Application Data

(60) Division of application No. 11/537,992, filed on Oct. 2, 2006, now abandoned, which is a continuation of application No. PCT/SE2005/000490, filed on Apr. 1, 2005.

(30) Foreign Application Priority Data

Apr. 2, 2004    (SE)    .................... 0400904

(51) Int. Cl.
C10K 3/06    (2006.01)
B01D 53/52    (2006.01)
F02B 27/04    (2006.01)

(52) U.S. Cl. ............... 48/214 A; 48/199 FM; 48/127.9; 60/273; 60/286; 60/295; 423/242.1; 423/245.3; 423/651; 423/655

(58) Field of Classification Search ............ 48/214 A, 48/199 FM, 127.9; 60/273, 286, 295; 423/242.1, 423/245.3, 651, 655; 422/198, 211, 217
See application file for complete search history.

(56) References Cited

U.S. PATENT DOCUMENTS

| | | | |
|---|---|---|---|
| 4,181,503 A | 1/1980 | Lesieur et al. | |
| 4,921,765 A | 5/1990 | Gmeindl et al. | |
| 5,034,287 A | 7/1991 | Kunz | |
| 5,198,310 A | 3/1993 | Fleming et al. | |
| 5,213,912 A | 5/1993 | Kunz et al. | |
| 5,240,270 A | 8/1993 | Colibert | |
| 5,277,448 A | 1/1994 | Colibert | |
| 5,507,939 A | 4/1996 | Russ et al. | |
| 5,686,196 A | 11/1997 | Singh et al. | |
| 5,725,234 A | 3/1998 | Colibert | |
| 5,993,984 A | 11/1999 | Matsumura et al. | |
| 6,024,372 A | 2/2000 | Colibert et al. | |
| 6,119,450 A | 9/2000 | Boegner et al. | |
| 6,129,835 A | 10/2000 | Lesieur et al. | |
| 6,145,303 A * | 11/2000 | Strehlau et al. | ............... 60/274 |
| 6,170,850 B1 | 1/2001 | Works | |
| 6,199,373 B1 | 3/2001 | Hepburn et al. | |
| 6,338,831 B1 * | 1/2002 | Strehlau et al. | ......... 423/244.07 |
| 6,641,625 B1 | 11/2003 | Clawson | |
| 6,758,036 B1 | 7/2004 | Molinier | |
| 6,824,577 B2 | 11/2004 | Deshpande | |
| 7,131,264 B2 | 11/2006 | Weissman et al. | |
| 7,197,867 B2 | 4/2007 | Huang et al. | |
| 2002/0041986 A1 | 4/2002 | Wojtowicz et al. | |
| 2002/0193247 A1 | 12/2002 | Krumpelt et al. | |
| 2003/0039597 A1 * | 2/2003 | Deeba et al. | ................. 422/177 |
| 2003/0064259 A1 | 4/2003 | Gittleman | |
| 2003/0188475 A1 * | 10/2003 | Ahmed et al. | ................. 44/639 |
| 2004/0006914 A1 | 1/2004 | Shaaban et al. | |
| 2005/0000210 A1 * | 1/2005 | Smaling et al. | ............... 60/286 |

FOREIGN PATENT DOCUMENTS

| | | |
|---|---|---|
| EP | 0359889 | 3/1990 |
| EP | 1188712 | 3/2002 |
| EP | 05722309.1-2113 | 9/2007 |
| EP | 05722309.1-2113 | 9/2009 |
| WO | 03/098728 A1 | 11/2003 |
| WO | 03098728 | 11/2003 |

OTHER PUBLICATIONS

International Search Report, PCT SE2005/000490, Jun. 17, 2005.

* cited by examiner

*Primary Examiner*—N. Bhat
(74) *Attorney, Agent, or Firm*—Novak Druce + Quigg LLP

(57) ABSTRACT

Method and apparatus for removing sulfur from a hydrocarbon fuel. The apparatus includes a combustion reactor (3) and a sulfur trap (4) and the combustion reactor (3) is adapted to operate with an air-to-fuel ratio below 1 and in the presence of steam. The sulfur trap (4) is located downstream the combustion reactor (3) and is adapted to remove sulfur compounds formed in the combustion reactor (3).

9 Claims, 1 Drawing Sheet

METHOD FOR REMOVING SULFUR FROM A HYDROCARBON FUEL

CROSS-REFERENCE TO RELATED APPLICATIONS

The present application is a divisional application of, and claims priority from, U.S. Ser. No. 11/537,992, filed Oct. 2, 2006, now abandoned which is a continuation patent application of International Application No. PCT/SE2005/000490 filed Apr. 1, 2005, which is published in English pursuant to Article 21(2) of the Patent Cooperation Treaty and which claims priority to Swedish Application No. 0400904-9 filed Apr. 2, 2004. Said applications are expressly incorporated herein by reference in their entireties.

FIELD

The invention generally relates to an apparatus and method for removing sulfur from a hydrocarbon fuel. In particular, the invention relates to a system for catalytic treatment of a hydrocarbon fuel.

BACKGROUND

Hydrocarbon fuels, such as diesel, gasoline and natural gas, have generally a sulfur content that in most cases needs to be reduced of environmental reasons and/or because sulfur is a potent poison for catalysts and catalytic processes.

Sulfur is present in hydrocarbon fuels in the form of a variety of sulfur compounds. The sulfur can be removed from the fuel in an industrial hydrodesulfurization process (HDS) before the hydrocarbon fuel comes into actual use, such as in combustion or reformation. HDS may be suitable for large-scale industrial processes where large quantities of hydrogen are available, but it is a costly and complicated process and therefore not suitable in other applications, such as automotive and fuel cell applications.

Another method is to remove sulfur after a fuel reforming step, such as steam reforming or partial oxidation, in which step the fuel is catalytically reformed into smaller hydrocarbons and hydrogen, and in which the sulfur is converted into $H_2S$. This method is relatively effective and useful in many situations. $H_2S$ can readily be removed from a gaseous stream by passing the sulfur-containing gas over a material that can react with the sulfur, such as ZnO, and thereby purge the gas stream of sulfur. However, this method has the disadvantage that the catalyst in the reactor will suffer from poisoning which results in short lifetimes for the catalytic system.

U.S. 2003/0188475 describes an example of a fuel reforming system where the sulfur trap has been incorporated after the catalytic reformer. In the disclosed system the fuel is initially vaporized and then catalytically converted in an autothermal reformer into a hydrogen rich gas before passed over the sulfur trap. The product is then fed via a water gas shift reactor and a catalytic preferential oxidation reactor to a fuel cell.

To avoid or at least reduce the problems related to sulfur contamination of catalysts, focus has generally been set on developing catalysts that are more resistant to sulfur or catalysts that are less expensive so that each replacement of poisoned catalyst becomes less costly.

SUMMARY

One object of the present invention is to provide an apparatus and a method for removing sulfur from a hydrocarbon fuel that eliminates or at least reduces the problems related to sulfur contamination of catalysts in a system for catalytic treatment of a hydrocarbon fuel.

The invention concerns an apparatus for removing sulfur from a hydrocarbon fuel, and the invention is characterized in that the apparatus comprises a combustion reactor and a sulfur trap. The combustion reactor is adapted to operate with an air-to-fuel ratio below 1.0 and in the presence of steam. The sulfur trap is located downstream of the combustion reactor and is adapted to remove sulfur compounds formed in the combustion reactor. Such a combustion reactor operates in the absence of catalysts and converts parts of the fuel into smaller components as well as converts the fuel content of sulfur compounds into easily removable compounds such as $H_2S$. By locating the sulfur trap between the combustion reactor and a subsequent catalytic reactor, the sulfur can be removed from a catalytic system before the catalysts in the system have come into contact with the sulfur. The present invention thereby eliminates, or at least minimizes sulfur poisoning of the catalysts in the catalytic reactor and thereby increases the life time of the catalytic part of the system.

The invention also concerns a method for removing sulfur from a hydrocarbon fuel that is characterized in that the fuel in a first step is fed to a combustion reactor that operates with an air-to-fuel ratio below 1.0 and in the presence of steam. In a second step the fuel is fed to a sulfur trap located downstream of the combustion reactor and the sulfur trap is adapted to remove sulfur compounds formed in the combustion reactor. This method makes it possible to remove the sulfur from the fuel before the fuel comes into contact with any catalysts that would be present in a catalytic reactor in a subsequent step of a method for catalytic treatment of a hydrocarbon fuel.

BRIEF DESCRIPTION OF THE DRAWINGS

The invention will now be described in more detail with reference to the following drawings in which FIG. 1 schematically illustrates one advantageous embodiment of the invention.

DETAILED DESCRIPTION

Figure 1:
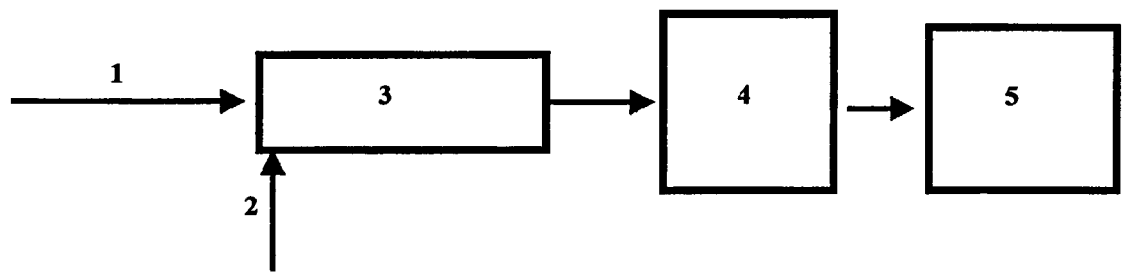

In this context, hydrocarbon fuel relates to any hydrocarbon fluid suitable for being used as a fuel, such as diesel, gasoline, ethanol, methanol, di-methyl ether and aviation fuels.

FIG. 1 schematically shows an advantageous embodiment of the invention. Hydrocarbon fuel 1 and steam/air 2 is fed to a combustion reactor 3 in which the hydrocarbon fuel is combusted under fuel rich conditions; i.e., the air-to-fuel ratio is below 1, in the presence of steam. In this combustion reaction the hydrocarbon fuel is partially broken down into smaller molecules and all or most of the sulfur is converted into $H_2S$. A sulfur trap 4 is located downstream the combustion reactor 4. By contacting the outgoing flow from the combustion reactor 3 with the sulfur trap 4, the sulfur compounds, generally $H_2S$, are removed from the hydrocarbon fuel. A catalytic reactor 5, in which the fuel is further converted catalytically, is located further downstream in the system. Typically, the catalytic reactor 5 could be a steam reformer or a partial oxidation reactor.

The combination of a combustion reactor 3 and a sulfur trap 4; i.e., the apparatus for removing sulfur from a hydrocarbon fuel according to the invention, is located upstream of the catalytic reactor 5 thus providing an effective way of preventing catalysts in a catalytic system from being exposed to sulfur from the combusted hydrocarbon fuel.

It is noteworthy that the combustion reactor 3 converts the various sulfur compounds into certain sulfur compounds, such as $H_2S$, that are easily separated from the fuel. To achieve this, it is important that the fuel-to-steam and air-to-fuel ratios be adapted to the selected fuel so that the rich fuel combustion process is stable. In many situations it is a principle aim to reform or convert the fuel to a large degree, and in these cases it is advantageous if the combustion reactor 3 not only converts sulfur compounds, but also converts the hydrocarbon fuel into smaller molecules as efficiently as possible. In such a situation, the combustion reactor 3 works as a pre-reformer. To enhance such pre-reforming reactions, it is advantageous to mix the steam with the air before injecting the air/steam into the combustion reactor 3.

The combustion reactor 3 is optimally operated with air-to-fuel ratios (lamda) between around 0.2-0.5, depending on the hydrocarbon used, but other air-to-fuel ratios can also give a satisfactory result. Steam is required in this step because it is used in the conversion of the sulfur compounds and it is also used for controlling the temperature in the reactor. Suitable temperature depends on such things as the type of hydrocarbon fuel used, but a typical suitable temperature is 350° C. The steam-to-fuel ratio depends to a large degree on the type of fuel.

The operating temperature of catalytic fuel reforming reactors such as steam reformers and partial oxidation reactors, in which the fuel is close to completely converted to small molecules, is much higher than in the combustion reactor 3. Typical temperatures are in the approximate range of 800-1200° C.

A suitable combustion process for the combustion reactor 3 is the so called "cold flame combustion" process or the "cool blue flame combustion" process, each of which are well known combustion reaction scenarios.

Most of the sulfur compounds formed in the combustion reactor 3 in the type of combustion reaction described above will be $H_2S$. This compound can easily be separated by means of conventional sulfur traps such as those containing ZnO. Another sulfur compound that may be formed in the combustion reactor 3 is COS. The amounts of COS formed depends on the operational conditions of the combustion reactor 3, but generally the amounts will be much smaller than the amounts of $H_2S$. By choosing a sulfur trap with a suitable material, both $H_2S$ and COS can be simultaneously removed. The sulfur trap is preferably a separate unit that can be replaced after some time when the adsorption material has been consumed to a certain prescribed degree. It should be noted that FIG. 1 only gives a schematic view of the system. Naturally, the system may comprise further catalytic reactors and/or sulfur traps. For instance, in some cases it may be necessary to implement a further sulfur trap downstream the catalytic reactor 5, as in a catalytic reforming system where some of the catalysts in subsequent catalytic reactors are ultra-sensitive to sulfur.

The invention is not limited to the above described embodiments, but a number of modifications are possible within the frame of the patent claims.

For instance, the catalytic reactor 5, or plurality of catalytic reactors located downstream of the sulfur trap 4 can be of various types relating to, for instance, the following catalytic processes: autothermal reforming, catalytic reforming, partial oxidation, steam reforming, exhaust gas catalytic oxidation, exhaust gas catalytic reduction, catalytic combustion, preferential oxidation and fuel cells. In these processes the fuel is further broken down and in many cases it is an advantage if the combustion reactor 3 works as a pre-reformer as mentioned above.

The invention claimed is:

1. A method for removing sulfur from a hydrocarbon fuel, said method comprising:
    feeding hydrocarbon fuel to a combustion reactor (3) and in which combustion of the fuel is performed with an air-to-fuel ratio below 1 and in the presence of steam; and
    feeding the fuel to a sulfur trap (4) located downstream of the combustion reactor (3), said sulfur trap (4) being adapted to remove sulfur compounds formed in the combustion reactor (3).

2. The method as recited in claim 1, wherein the combustion reactor (3) operates with an air-to-fuel ratio between 0.2 and 0.5.

3. The method as recited in claim 1, wherein the combustion reactor (3) breaks down at least long hydrocarbon molecules into smaller molecules.

4. The method as recited in claim 1, wherein the combustion reactor (3) converts a large fraction of the fuel content of sulfur compounds into $H_2S$.

5. The method as recited in claim 1, wherein the combustion reactor (3) operates at a temperature of approximately 300-400° C.

6. The method as recited in claim 1, wherein the sulfur trap (4) is of a type containing ZnO.

7. The method as recited in claim 1, wherein the method further comprises utilizing a catalytic reactor (5) for removing sulfur from the hydrocarbon fuel, and wherein said combustion chamber (3) and sulfur trap (4) are located upstream the catalytic reactor (5).

8. The method as recited in claim 7, wherein the catalytic reactor (5) operates as a fuel reforming reactor, such as a steam reformer or a partial oxidation reactor.

9. The method as recited in claim 7, wherein the fuel is further treated in at least one of catalytic reactors and sulfur traps.

* * * * *